(12) United States Patent
Turpin et al.

(10) Patent No.: US 7,693,634 B2
(45) Date of Patent: Apr. 6, 2010

(54) CONTROL PROCESS FOR MODE CHANGE DECISIONS FOR AN INFINITELY VARIABLE TRANSMISSION

(75) Inventors: Thomas Turpin, Orsay (FR); Laurent Royer, Paris (FR)

(73) Assignee: Renault s.a.s., Boulogne Billancourt (FR)

( * ) Notice: Subject to any disclaimer, the term of this patent is extended or adjusted under 35 U.S.C. 154(b) by 1168 days.

(21) Appl. No.: 11/134,413

(22) Filed: May 23, 2005

(65) Prior Publication Data

US 2007/0007914 A1    Jan. 11, 2007

(51) Int. Cl.
    *G06F 7/00* (2006.01)
(52) U.S. Cl. .......................................... 701/51
(58) Field of Classification Search ............ 701/51; 477/34–35, 37, 42; 307/123; 475/198
    See application file for complete search history.

(56) References Cited

U.S. PATENT DOCUMENTS 4,336,725 A * 6/1982 Patterson .................... 76/25.1

5,797,822 A * 8/1998 Green ........................ 475/306
2002/0024306 A1   2/2002 Imai et al.

FOREIGN PATENT DOCUMENTS

EP   1 090 792 A2    4/2001
FR   2 823 281       10/2002

* cited by examiner

*Primary Examiner*—Yonel Beaulieu
(74) *Attorney, Agent, or Firm*—Oblon, Spivak, McClelland, Maier & Neustadt, L.L.P.

(57) ABSTRACT

A control process for mode change decisions for an infinitely variable transmission with several modes of operation including at least two parallel coupling paths, each containing a closed coupler for the first mode of operation and open for a second mode of operation, with the two couplers being closed simultaneously during a delay period during the mode changes, wherein the mode change decision is imposed onto the transmission if the speed differential at the terminals of the coupler to be closed to change the mode, exceeds a first pre-established threshold.

18 Claims, 8 Drawing Sheets

CONTROL PROCESS FOR MODE CHANGE DECISIONS FOR AN INFINITELY VARIABLE TRANSMISSION

FIELD OF THE INVENTION

This invention involves the control of the continuous variation or infinitely variable automatic transmissions.

More precisely, it deals with the control of the mode changes for an infinite variable transmission with several operating modes comprising at least two parallel coupling paths each CONTAINING a closed coupler for a first mode of operation and open for a second mode, with both couplers being closed simultaneously during a delay period while the mode changes take place.

This invention has an privileged application, but non-limitative, for a transmission device of a type that includes at least two parallel power transmission paths, one path containing a kinematic chain with fixed gear reduction, and another path containing a continuous variable speed drive, comprising two electric units.

DESCRIPTION OF THE RELATED ART

Through publication FR 2 823 281, a device of the type indicated herein is known, according to which the various paths are connected, on the one hand to a mechanical input distributor linked to a mechanical energy source such as a thermal motor, and on the other hand, to an mechanical output distributor linked to the wheels of the vehicle. The mechanical input and output distributors are preferably, but not compulsory, planetary gear sets.

Such a transmission includes two principal modes of operation, using one or the other of the two coupling paths. For each mode, the coupling means, or couplers, of the unused coupling path, are open, while those of the used coupling path are closed.

According to publication FR 2 823 281, mode changes occur at certain special operating points of the transmission, corresponding to the overshooting of given ratio thresholds. The transmission mode changes are determined on the basis of the overall kinematics of the latter by attributing to each operating mode a given ratio range. As such, at each operating point of the transmission, the latter is positioned on an appropriate operating mode.

The mode changes for such a transmission are as such triggered so that the transmission mode is always compatible with its kinematics at the operating point targeted by the computer.

Adoption at any time of the most appropriate operating mode permits effectively to optimize transmission operation.

However, poor decision making of the mode change can introduce parasite oscillations at the level of the uncoupling systems or couplers, that are felt by the driver. In addition, certain mode changes can be useless at the operating point targeted by the computer.

SUMMARY OF THE INVENTION

This invention is aimed at controlling the mode change decisions for an infinitely variable power bypass transmission.

In accordance with the invention, control of the mode change decisions is based on calculating the differential ratios or speeds at the terminals of the transmission couplers and the development of an estimated value of these differential ratios.

Calculation of these variables can use for instance the coefficients of a matrix that permits entering the speed differentials between the input and output of each coupler on the basis of the input and output speeds of the transmission, and the set point of the input speed of the transmission at the operating point targeted by the computer of the transmission at a given moment.

The invention proposes that a mode change decision be imposed onto the transmission if the speed differential at the terminals of the coupler to be closed to change mode, exceeds a pre-established first threshold.

Preferably, the active mode is kept as such if the speed differential at the terminals of the open coupler for this mode, exceeds a second pre-established threshold with an opposite sign of the first.

According to publication FR 2 823 281, for each coupling path, one controls an operating speed that permits preserving for the transmission, the same overall speed reduction ratio during the period of simultaneous closing of the couplers. For that purpose, the variable speed drive cooperates with a speed synchronization device for the purpose of controlling the speed differentials between the input and the output of the couplers, so that the input and output speeds of the variable speed drive remain constant during the mode changes.

Transitions between two successive transmission modes must have been achieved quickly, without the knocking felt by the drivers and without affecting the thermal engine output.

For that purpose, this invention aims to optimize the control of the coupling means of an infinitely variable transmission with two modes of operation, during the mode change operations.

More particularly, it proposes that the change operation includes a preparation phase consisting in canceling the speed differential between the input and output of the open couple for a first mode, before starting to close this coupler.

Preferably, the speed differential between the input and output of the first coupler is zero regulated during its closing phase, and the two couplers do not show any slipping during their simultaneous closing phase.

However, these arrangements are not sufficient to optimize the sequence of mode change operations themselves.

To achieve this last objective, and to reduce in particular the duration of the mode changes, the invention proposes to make use of the knowledge of coupler dynamics.

More in particular, it provides to control in advance the mode change decisions of infinitely variable transmission with power bypass, so as to reduce the duration of the mode change operations.

In accordance with the invention, a mode change is decided in advance of a given moment, if the differential speed variation at the terminals of this coupler at the end of a given period, leaves the current mode domain, for instance, by changing sign during this period.

Preferably, the mode change is only decided if the differential speed variation between the terminals of this coupler is lower than a first pre-established variation threshold, and that the estimated value of the differential speed is lower than an estimated pre-established first differential threshold.

BRIEF DESCRIPTION OF THE DRAWINGS

Other features and advantages of this invention will appear clearly upon reading the following description of a non-limitative mode of performance, while referring to the attached drawings, on which.

DETAILED DESCRIPTION OF THE PREFERRED EMBODIMENTS

As indicated above, the invention applies to an infinitely variable transmission with power bypass and with two modes of operation comprising two couplers, closed respectively for a first and a second mode of operation, while complying with mode change constraints determined by the transmission kinematics.

For each of the following variables,

Win: input speed of the transmission

Wout: output speed of the transmission

DWa and DWb: differential rotation speeds at the terminals of the couplers, the transmission computer is capable of preparing, through matrix calculation, a set point value or estimated value that corresponds to their value at the operating point targeted:

CWin: set point or estimated value of the input speed of the transmission

CDWa and DCWb: set points or estimated values of the differential speed at the terminals of the couplers.

As such, the following can be stated:

$DWa=Fa(Win, Wout)$ $DWb=Fb (Win, Wout)$ $CDWa=Fa(CWin, Wout)$ $CDWb=Fb (CWin, Wout)$ with Fa and Fb being the functions defined by the coefficients of a matrix.

Knowing that the optimal point for a mode change is when DWa and DWb are zero, the domains authorized for each mode of operation by the transmission kinematics are as such: DWa=0 with DBb>0 for mode A, and DWa<0 with DWb=0 for mode B. However, since the algebraic signs for DWa and DWb are purely conventional, one must consider that the invention applies under the same conditions to a transmission for which one might state:

DWb<0 in mode A and DWa>0 in mode B.

The figures also mention different value thresholds taken into consideration in the control process proposed:

SPa: Positive threshold of mode A

SCa: Set point threshold for mode A

SNa: Negative threshold for mode A

SPb: Positive threshold for mode B

SCb: Set point threshold for mode B

SNb: Negative threshold for mode B

Figure 1:
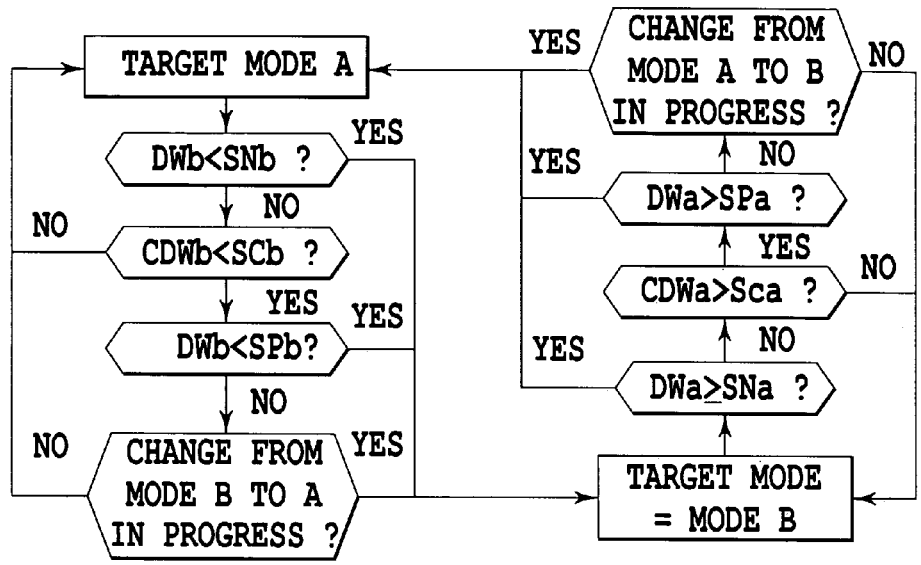
FIG. 1 illustrates the determination of a n operating mode or "target mode" set point.

FIG. 1 distinguishes two situations called respectively Target Mode=MODE A, and Target Mode=MODE B, according to whether the established or estimated mode on the basis of the operating point targeted by the computer is mode A or mode B. In accordance with this scheme, one sees that the passage from Mode A to Mode B is foreseen when DWb<SNb, in other words, when the speed differential at the terminals of the open coupler DWb has a lower algebraic value at a first SNb threshold, called negative threshold of mode B. If not, if DWb>SNb, the same change from target Mode A to B is also scheduled if the estimated value CDWb of the same differential DWb is itself lower than an estimated threshold or set point threshold SCb of mode B, and that DWb is lower than a second threshold SPb called positive threshold of mode B. The change of target mode from A to B is also scheduled in a third situation, when the estimated value CDWb is lower than SCb, that DWb is higher than SPb and that a change from B to A is in progress. The conditions for changing from target Mode B to A shown also on the right part of the figure, are analogous.

Figure 2:
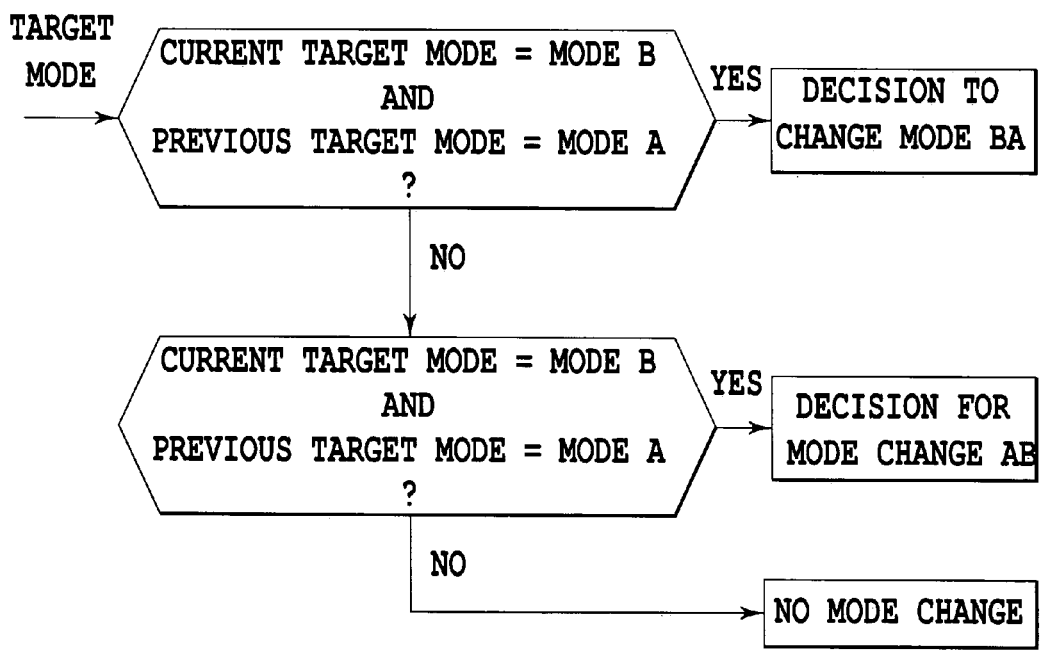
FIG. 2 shows the passage from target mode to decision making.

FIG. 2 is destined to point out the distinction between the change of the target mode and the actual decision making of the mode change, on the basis of the target mode determined by the computer. The input information is the mode targeted by the computer in accordance with FIG. 1. If at a given moment, the target is A, while it was B previously, the decision for change BA (going from B to A) is made. Inversely, the decision for change AB (going from A to B) is made if the target mode changes from A to B. Finally, if one is not in one of the previous situations, the current mode is preserved.

Figure 3A:
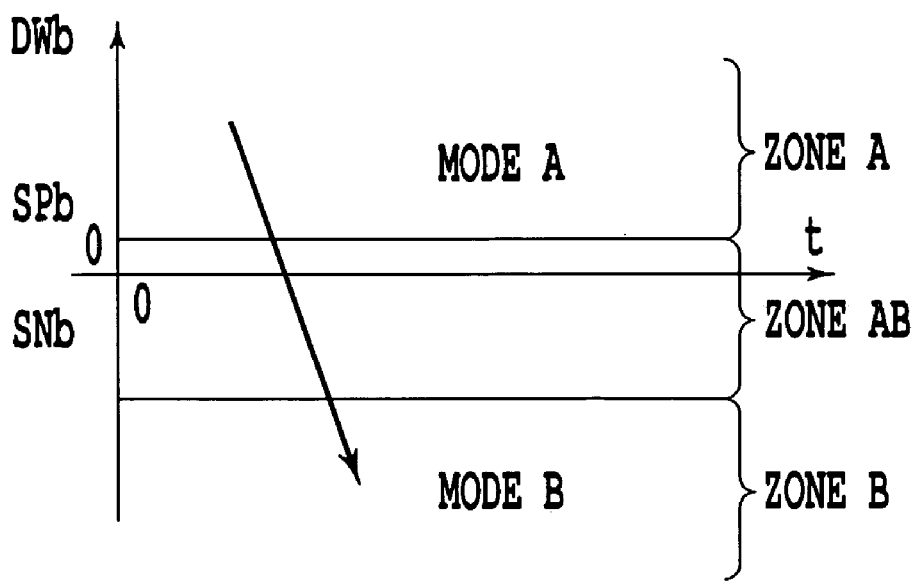
FIGS. 3A to 3D show on a graph the existence of set point zones.
Figure 3B:
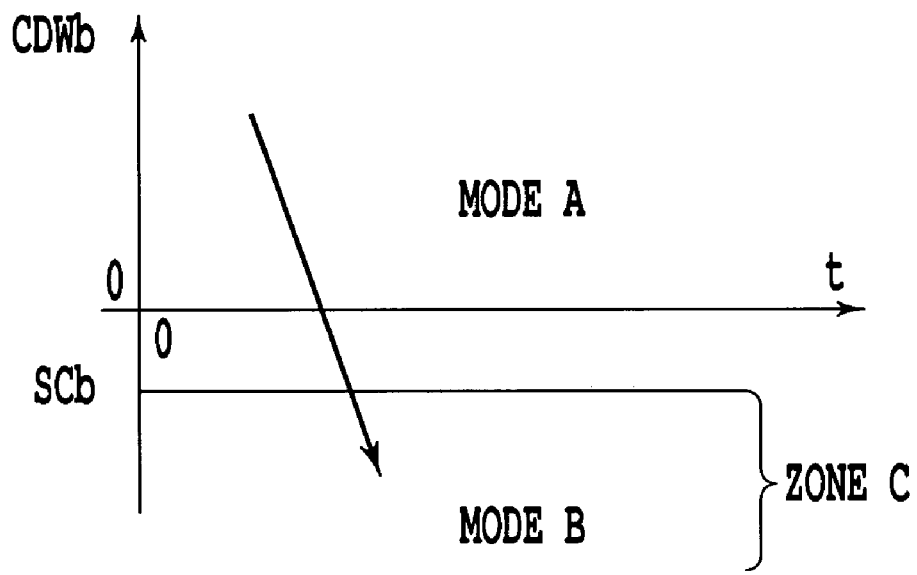

FIGS. 3A and 3B illustrate the decision making conditions for mode change starting from active mode A.

Since the active mode at an initial moment (†=0) is mode A, if subsequently DWb remains higher than SPb, the operating mode is in zone A, and as such, mode A is kept. If DWb exceeds the SNB threshold (becomes an algebraic value lower than the one on the diagram), one goes to zone B, as such mode B is targeted and the AB mode change is decided.

In the AB zone, located between the two thresholds SPb and SNb, the decision for a mode change depends on the estimated value CDWb of the DWb speed differential of the coupler to be closed for the mode change.

If the DWb speed differential at the terminals of the coupler to be closed (and as such, open for the active mode) falls within the two pre-established SNb and SPb thresholds, and that its CDWb estimated value is in zone C of FIG. 3B (CDWb is lower than the pre-established SCb threshold), the AB mode change is imposed.

Finally, if a BA mode change is already in progress and CDWb enters zone C, located under the SCb threshold, the target mode becomes again B and the BA mode change is interrupted. As such, the BA mode change is interrupted when the DCWb estimated value exceeds the SCb threshold (it algebraic value becomes lower than that on the diagram).

Figure 3C:
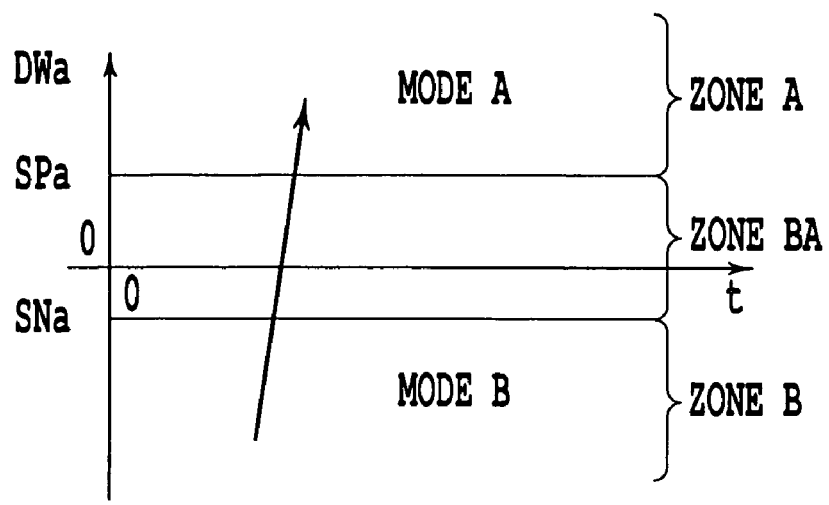
Figure 3D:
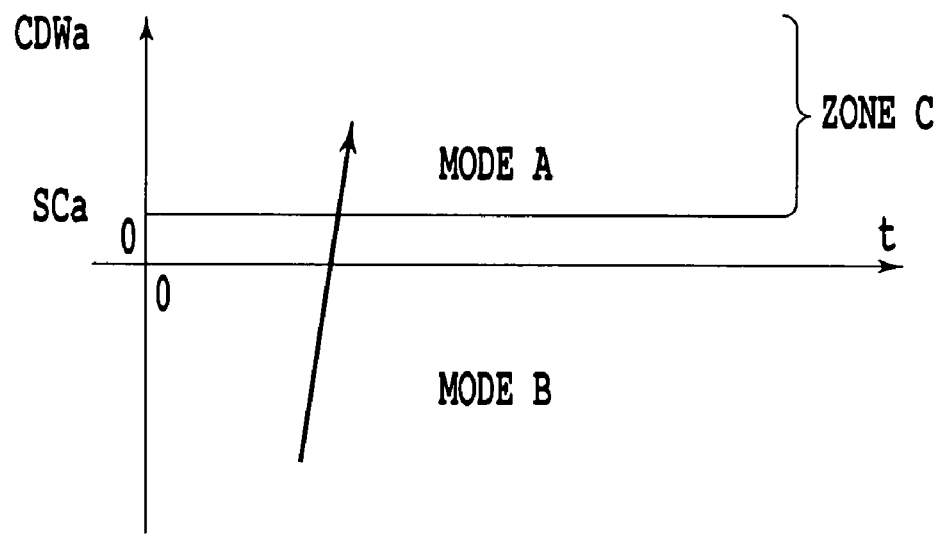

FIGS. 3C and 3D illustrate the BA mode change, and are read in the same way as FIGS. 3A and 3B, by replacing A by B and B by A.

Figure 4:
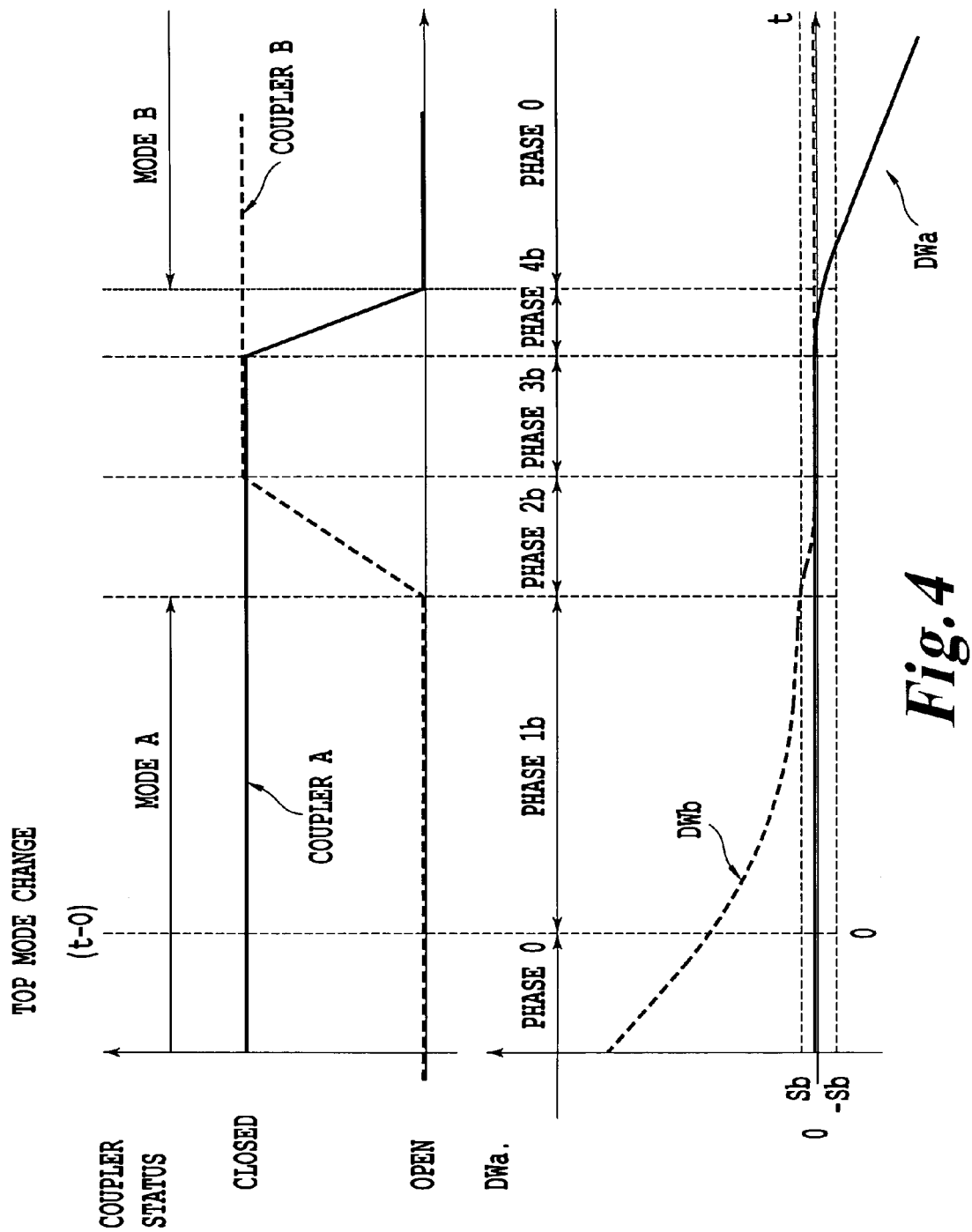
FIGS. 4 and 5 illustrate the sequence of the mode change proposed by the invention between a first mode A and a second mode B and by symmetry, the passage from mode B to mode A.
Figure 5:
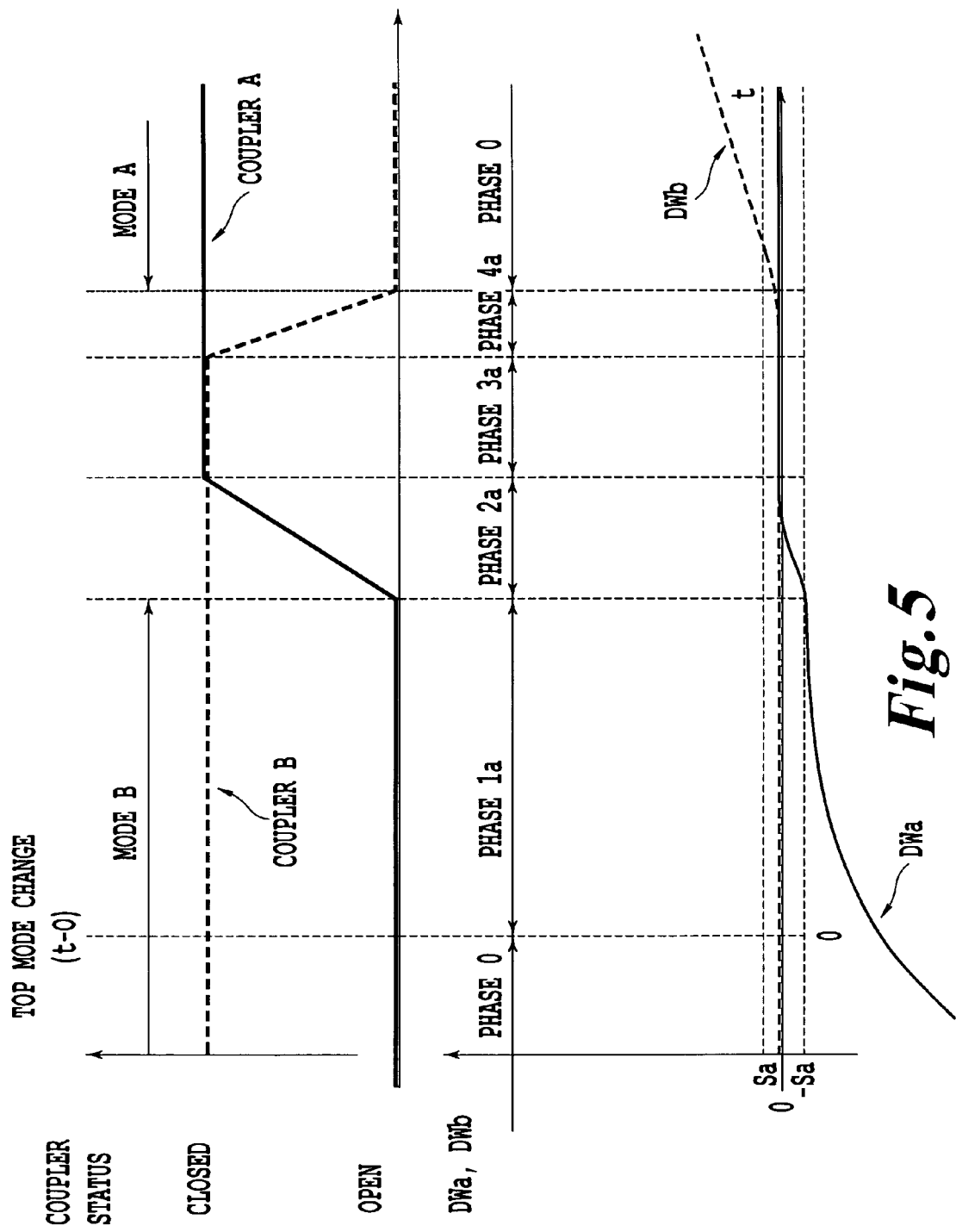

On FIGS. 4 and 5, we have shown the status on the basis of time, of two couplers of an infinitely variable transmission for mode change as described in publication FR 2 823 281. In accordance with this publication, in a first mode A, coupler A of a first coupling path is closed while that of the second coupling path B is open.

Inversely, in mode B, coupler B is closed and coupler A is open.

DWa and DWb are respectively the speed differentials between the input and output of couplers A and B that is obtained by the matrix calculation from Win and Wout input and output speeds of the transmission.

Knowing that the following relationships exist:

$$DWa = Fa\ (Win, Wout)$$

$$DWb = Fb\ (Win, Wout)$$

where Fa and Fb are functions defined by coefficients of a Z matrix (for instance such as shown in publication FR 2 823 281) and the mode change includes a simultaneous closing phase, without slipping, of two couplers, the invention process provides:

passage through a phase where the two couplers are closed, and pre-position the couplers so that DWa=DWb=0 for the full duration of the mode changes In accordance with FIG. 4, the various phases of the change operation from mode A to mode B are as follows, from the moment †=0 where the transmission is in mode A established with the uncoupling system A closed and the uncoupling system B open:

phase 1b: canceling of DWb of its current value to 0, with coupler A kept closed phase 2b: regulation of DWb at 0, while closing coupler B, and with coupler A kept closed.

phase 3b: regulation of DWa or of DWb at 0, with couplers A and B being kept closed.

phase 4b: regulation of DWa at 0, with opening of coupler A, and with coupler B being kept closed.

As such, mode B is established during phase 4b, when coupler A is completely open. Phase 1b is a preparatory phase for lowering the DWb differential at the terminals of coupler B to 0, except for threshold Sb, before starting to close this coupler. During phase 2b of closing coupler B, DWb is mechanically brought to 0. Finally, phases 2b, 3b, 4b represent the operation of the mode change as such, in other words, inversion of the couplers.

FIG. 5, that illustrates the change from mode B to A, is analogous to the preceding one. One finds phases 1a to 4a that correspond to phases 1b to 4b of FIG. 1:

phase 1a: cancellation of DWa phase 2a: regulation of DWa to 0 phase 3a: regulation of DWa or DWb to 0 with simultaneous closing of the two couplers phase 4a: regulation of DWb to 0, with opening of coupler B, while maintaining coupler A closed.

Figure 6A:
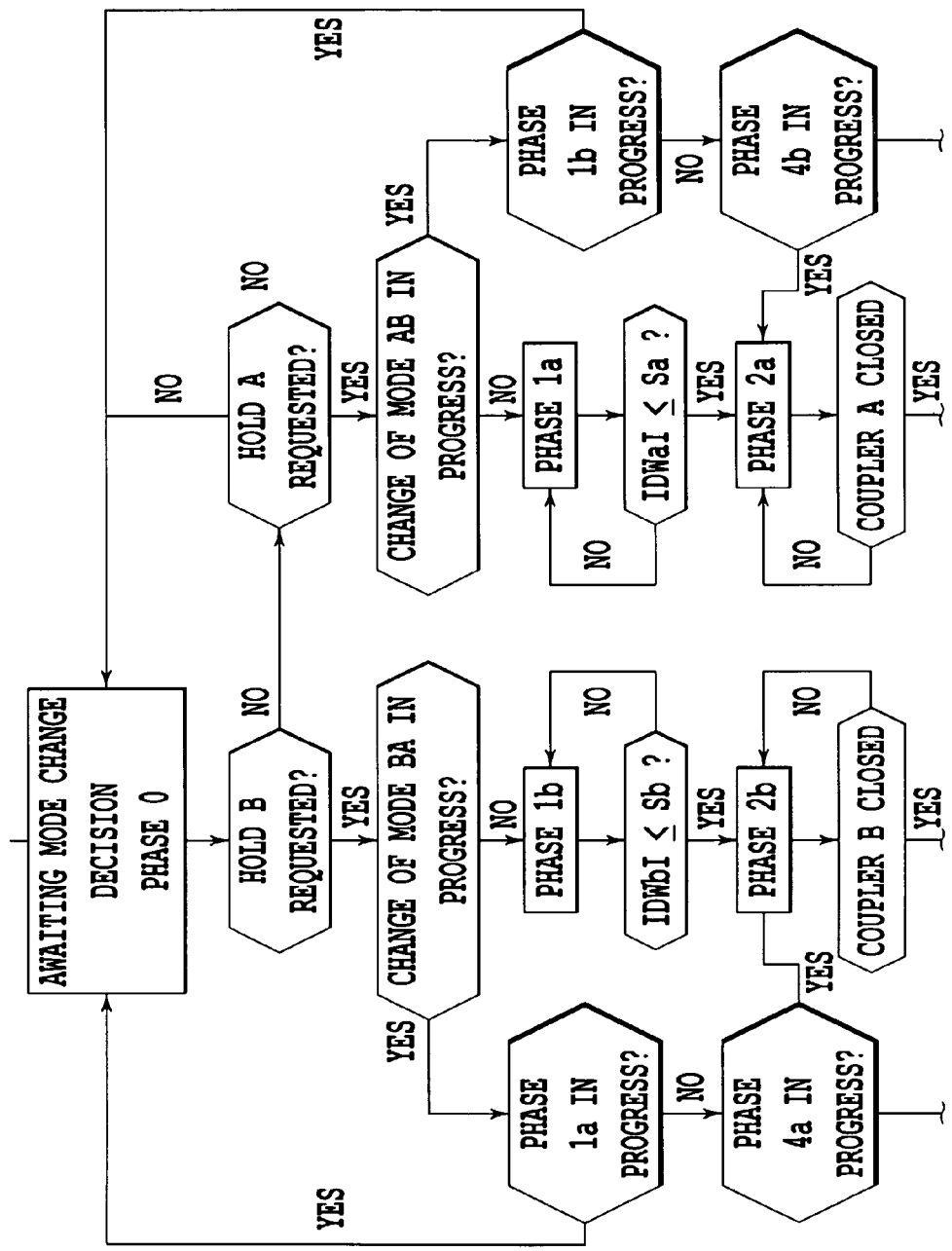
FIG. 6 is a functional diagram of the invention process.
Figure 6B:
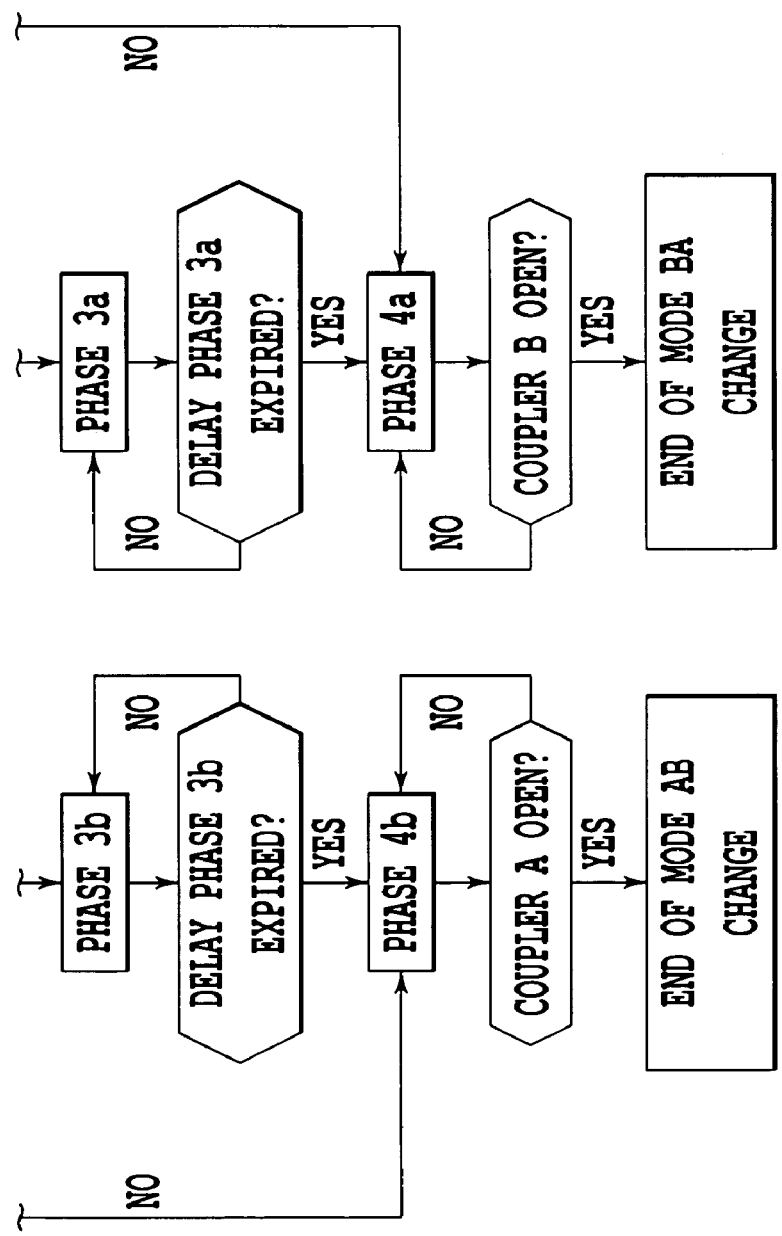

The organizational diagram of FIG. 6 shows on the left the breakdown of the change of mode AB (from A to B) in its various phases 1B to 4B, from the moment when this change is requested (mode change top). Then, the computer checks whether a change of mode BA (from B to A) is in progress or not. If a change of mode BA is in progress, and phase 1a is in progress, the computer puts the transmission back in mode A (phase 0=awaiting the mode change). If not, it is either phase 4a that is in progress, in which case the computer resumes the process of mode change AB directly in phase 2b, or it is another phase of mode BA that is in progress, in which case the computer resumes the process of mode change AB in phase 4b.

When a change of mode BA is not in progress during the AB request, the latter is launched (phase 1b). When the DWb speed differential is passed below threshold Sb, one goes to phase 2b (closing of coupler B), then in phase 3b, when this closing is effective.

At the end of a predetermined delay period (that can be zero), coupler A starts to open (phase 4b). The mode change operation is ended when coupler A is fully open.

The right side of FIG. 6, that details the operation of mode change BA, is read in the same way as the left side.

In accordance with the invention, as soon as the mode change set point changes, the control loop of FIG. 6 must be reinitialized to permit the interruptions. In addition, different possibilities for going from AB to BA and inversely, exist. In particular, if the change of set point takes place in phase 1B or 1A, one returns to phase 0. On the other hand, if one compares FIGS. 1 and 2, one observes that one can go directly from 2b to 4a, from 4b to 2a, from 2a to 4b, from 4a to 2b, from 3a to 4b and from 3b to 4a.

In conclusion, the invention defines a control process for mode changes of an infinitely variable transmission that is based on the breakdown of the various phases necessary for making a mode change. This process complies among other with the conditions defined in publication FR 2 823 281. The invention permits making the desired mode change, rapidly and without jerking, by complying with the following constraints:

continuity of torque at the wheel by the simultaneous activation of two modes;

preservation of the transmission ratio during the transient phases of the mode change regulation of the differential speed at the terminals of the couplers, to pre-position them and control their positions during the full duration of the mode changes possibility of interrupting the mode change process, if an opposing mode change decision is issued.

Going from one transmission mode to the other must among other be triggered at the right time so that the current transmission mode is always in the acceptable domain for the overall kinematics of the transmission, and so that at any time, the operating point of the transmission is near the operating point while complying with the defined mode change constraints, for instance, as indicated in publication FR 2 823 281.

For each of the following variables,

Win: input speed of the transmission

Wout: Output speed of the transmission

DWa and DWb: differential rotation speeds at the terminals of couplers A and B;

the computer of the transmission is capable of preparing through matrix calculation, a set point value or an estimated value that corresponds to their value at the point of operation targeted:

CWin: set point or estimated value of the input speed of the transmission

CDWa and CDWb: set points or estimated values of the differential speed at the terminals of couplers A and B.

As such, the following can be stated:

$$DWa = Fa\ (Win, Wout)$$

$$DWb = Fb\ (Win, Wout)$$

$$CDWa = Fa\ (CWin, Wout)$$

$$CDWb = Fb\ (CWin, Wout)$$

with Fa and Fb being functions defined by the coefficients of a matrix.

In accordance with the invention, control of the mode change decisions also uses the following variables:

gradCDWa and gradCDWb: variations of the estimated differential speed values at the terminals of couplers A and B (derived, gradient, slipping gradient, . . . .)

gradDWa and gradDWb: variations of the differential speeds at the terminals of couplers A and B (derivative, gradient, slipping gradient, . . . )

xa and xb: duration of closing of couplers A and B.

DWa(†+xa) and DWb (†+xb): anticipated differential rotation speeds at the terminals of couplers A and B that will be achieved xa and xb seconds after the current moment †:

$$DWa(†+xa)=DWa(†)+\text{grad}(DWa)*xa$$

Knowing that the optimal point of mode change is when DWa and DWb are zero, the authorized domains for each mode of operation by the transmission kinematics are by construction: DWa=0 with DWb>0 for mode A and DWa<0 with DWb=0 for mode B. However, since the algebraic signs of DWa and DWb are selected arbitrarily, the inverse conventions can also be retained and decide that DWb<0 for mode A and DWa>0 for mode B.

Figure 7:
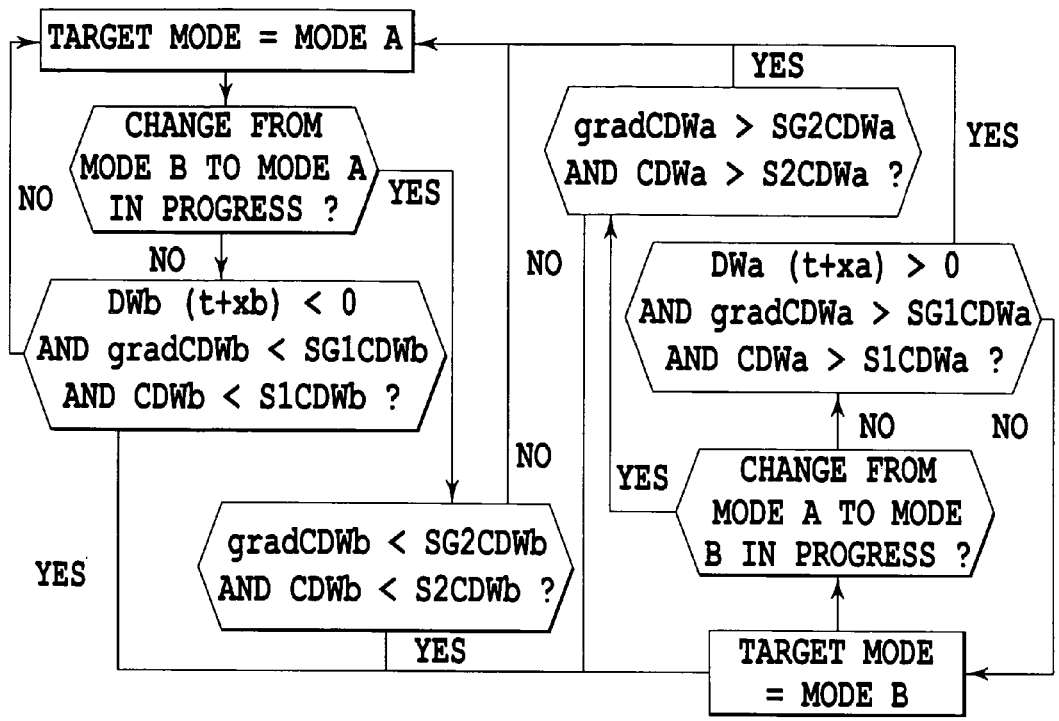
FIG. 7 illustrates the determination of an operating mode or "target mode" set point, and FIG. 8 summarizes the conditions for going from the target mode to the actual decision making for a mode change.

FIG. 7 also indicates the various value thresholds taken into account in the proposed control process:

SG1CDWa and SG1CDWb: first estimated value variation thresholds for differential speed at the terminals of couplers A and B;

SG2CDWa and SG2CDWb: second estimated value variation thresholds for differential speed at the terminals of couplers A and B S1CDWa and S1CDWb: first threshold of the estimated differential speed at the terminals of couplers A and B S2CDWa and S2CDWb: second threshold of estimated speed differential at the terminals of couplers A and B FIG. 7 distinguishes two situations called respectively Target Mode=MODE A, and Target Mode=MODE B, according to whether the mode established or in progress of being established (AB or BA change in progress), is mode A or mode B.

If at a given moment t, the target mode is mode A, one observes that the first check of the control loop is to know whether this mode is actually established (current mode) or not (change of BA mode in progress).

In the first case, the target mode, where the mode set point passes in anticipation from A to B at this time, provided that three conditions are met:

if the differential speed DWb (†+xb) at time †+xb at the terminals of open coupler B for the current mode has left the domain of mode A, being a sign opposite the speed differential at the terminals of the same coupler at time †, if variation of the estimated differential speed gradCDWb at time † at the terminals of coupler B is less than a first pre-established estimated gradient threshold SG1CBWb, and if the estimated value CDWb of the differential speed at the terminals of coupler B is less than the first threshold of the pre-established S1CDWb estimated differential speed.

In the other case, in other words, if a BA mode change is in progress, the target mode goes from A to B when the following two conditions are met:

variation of the gradCDWb estimated differential speed at the terminals of the coupler to be closed to reintroduce mode B is less than a second gradient threshold of the pre-established SG2CDWb speed, and the CDWb estimated speed differential at the terminals of coupler B is less than a second threshold of the pre-established S2CDWb estimated speed differential.

Finally, when a BA mode change is in progress and the last two conditions are not met simultaneously, the set point is not inversed and the target mode remains mode A, which means that the BA mode change goes on.

In accordance with the invention, the conditions for the target mode change from the mode B set point indicated on the right of FIG. 7 are analogous by symmetry to those that were just described.

Figure 8:
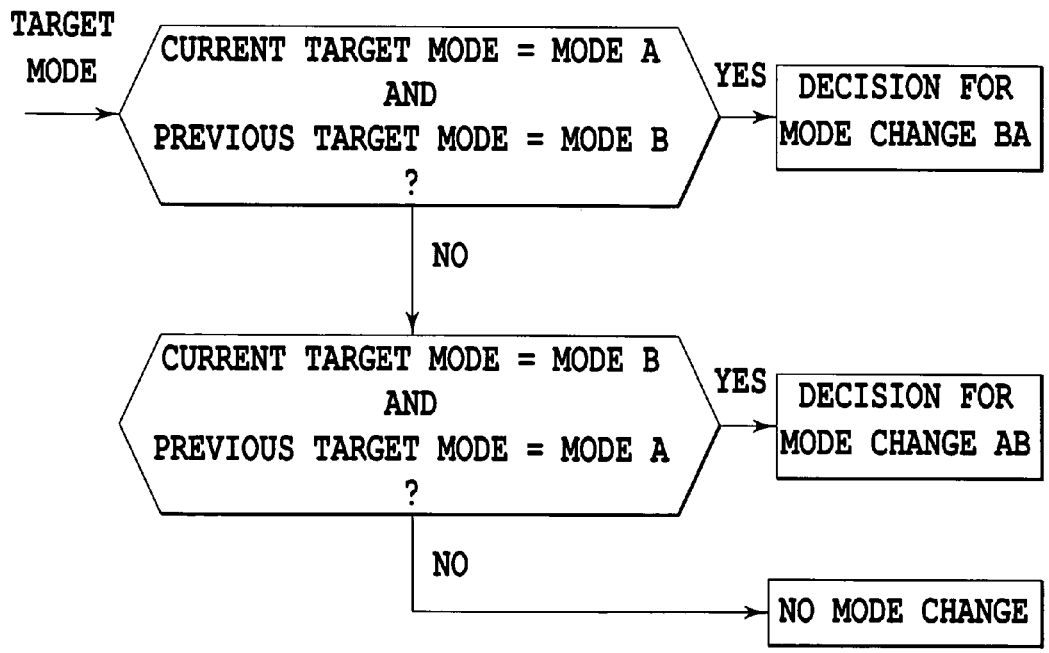

The purpose of FIG. 8 is simply that of showing the difference between the target mode change and the actual decision making of the mode change, on the basis of the target mode determined by the computer. The input information is the mode targeted by the computer according to FIG. 7. If at any given time, the target is A, when it was previously B, the BA change decision (going from B to A) is made. Inversely, the AB change decision (going from A to B) is made if the target mode has gone from A to B. Finally, if one is not in one of the previous situations, the current mode is kept. Like FIG. 7, FIG. 8 can be read in the same manner by inversing the designation of modes A and B.

In conclusion, one observes that in accordance with the invention, development of the set point generation for the mode change is based on:

development of the differential speeds at the terminals of the decoupling systems;

elaboration of set points of these same differential speeds, and an estimate of the duration for closing the coupler in question.

As such, the control process proposed by the invention makes use of the knowledge of coupler dynamics, so as to reduce the duration of actual mode change and to avoid the oscillations of the mode change set point when the operating point of the transmission is close to the optimal operating point of the mode change.

Indeed, the invention permits the premature triggering of the mode change decision, by forecasting the evolution of the open coupler on the current mode, and the time of canceling the speed differential at the terminals of this coupler.

Thanks to this invention, the duration for canceling the speed differential at the terminals of the coupler in question coincides with its duration for closing, so that the total duration of the mode change operation is reduced by the time usually required to equalize the speeds at the terminals of the open coupler for the current mode before starting to close the latter.

The invention claimed is:

1. A process implemented by a transmission computing device, for controlling mode change decisions for an infinitely variable transmission with several operating modes, comprising:

closing a first coupler during a first mode of operation;

opening a second coupler during a second mode of operation, the first and second couplers being closed simultaneously for a delay period during which the mode of operation changes; and implementing the mode change decision onto the transmission, by the transmission computing device, when a speed differential at a terminal of a coupler to be closed during the mode change exceeds a first threshold.

2. The control process according to claim 1, wherein an active mode is kept as such if the speed differential at the terminals of the open coupler for this mode exceeds a second pre-established threshold having a sign opposite to the first pre-established threshold.

3. The control process according to claim 2, wherein between the two thresholds, the decision making for the mode change depends on an estimated value of the speed differential of the open coupler.

4. The control process according to claim 3, wherein a mode change decision is imposed if the speed differential at the terminals of the open coupler on the active mode is situated between the two first thresholds and that the estimated value of the speed differential of the open coupler exceeds a third pre-established threshold.

5. The control process according to claim 3, wherein the mode change in progress is interrupted when the estimated value of the speed differential at the terminals of the coupler to be closed exceeds a third pre-established threshold.

6. The control process according to claim 1, further comprising:
    annulling the speed differential between the input and output of the open coupler on the first mode, before starting to close the open coupler.

7. The control process according to claim 6, wherein the mode change operation has a preparation phase for suppressing slippage inside the first coupler, followed by transient phases for closing the first coupler, of simultaneously maintaining in position of closing of the first and second coupler and of opening the second coupler while maintaining the first coupler in the closed position.

8. The control process according to claim 7, wherein the speed differential between the input and the output of the first coupler is regulated to zero during its closing phase.

9. The control process according to claim 6, wherein the first and second coupler do not display any slippage during their simultaneous closing phase.

10. The control process according to claim 6, wherein a control loop of the mode change operations is initialized as soon as a mode change set point changes.

11. The control process according to claim 6. wherein an inversion of a mode change set point during a closing phase of a coupler is translated by a direct passage to an opening phase of the same coupler in an inverse mode change operation.

12. The control process according to claim 6, wherein a mode change set point inversion during an opening phase of a coupler is translated by a direct passage to a closing phase of the same coupler in an inverse mode change operation.

13. The control process according to claim 1, wherein a mode change is decided in advance at a moment † if a speed differential [DWa(†+xa), DWb(†+xb)] at the terminals of the open coupler on the current mode after a predetermined period xa, xb, leaves a current mode domain, and the DWa and DWb variables are differential rotation speeds at the terminals of the couplers.

14. The control process according to claim 13, wherein a mode change is decided if the speed differential [(DWa(†+xa), DWb(†+xb)] at the end of period xa, xb has a sign opposite that of moment \.

15. The control process according to claim 13, wherein a mode change is decided if the estimated speed differential variation between time † and time †+a, †+b, is less than or equal to a first pre-established variation threshold.

16. The control process according to claim 15, wherein a mode change is decided when an estimated value of the speed differential at the terminals of the differential to be closed for the new targeted mode is less than a first estimated pre-established speed threshold.

17. The process according to claim 13, wherein that the mode change decision is inversed if an estimated speed differential variation at the terminals of the coupler to be closed to reintroduce this mode is less than a second pre-established variation threshold .

18. The control process according to claim 17 wherein the mode change decision is inversed if an estimated speed differential at the terminals of this coupler to be closed is less than a second pre-established estimated speed threshold.

* * * * *